J. H. MOSEL.
TRUCK.
APPLICATION FILED FEB. 13, 1919.

1,432,296.

Patented Oct. 17, 1922.
2 SHEETS—SHEET 1.

Inventor
Joseph H. Mosel
By
Thurston & Kwis
atty's

J. H. MOSEL.
TRUCK.
APPLICATION FILED FEB. 13, 1919.
1,432,296.
Patented Oct. 17, 1922.
2 SHEETS—SHEET 2.
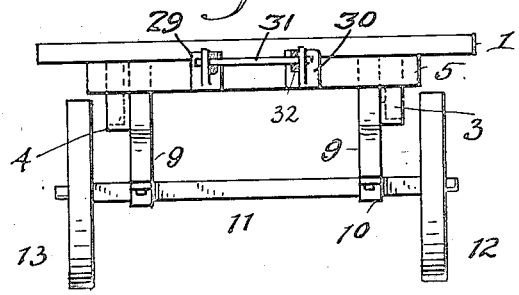
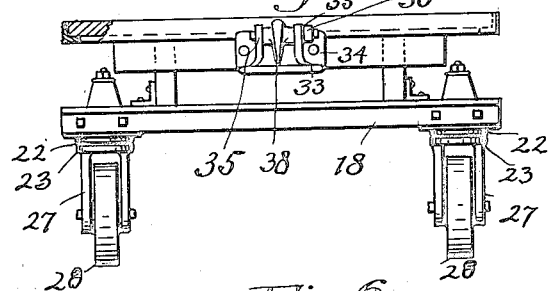
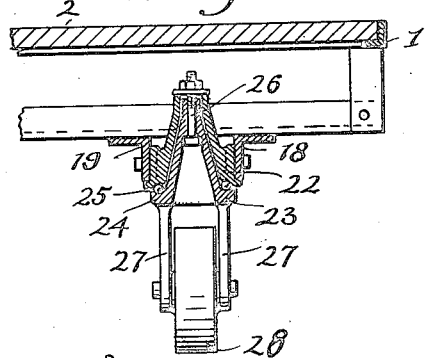
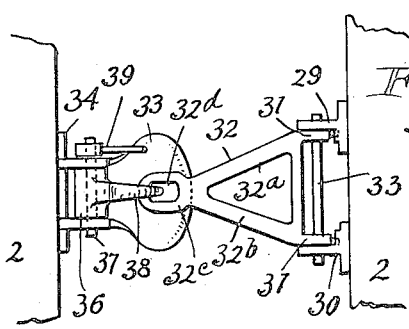
Inventor:
Joseph H. Mosel
By
Thurston & Kwis
attys.

Patented Oct. 17, 1922.

1,432,296

UNITED STATES PATENT OFFICE.

JOSEPH H. MOSEL, OF LAKEWOOD, OHIO, ASSIGNOR TO THE LAKEWOOD ENGINEERING COMPANY, OF LAKEWOOD, OHIO, A CORPORATION OF OHIO.

TRUCK.

Application filed February 13, 1919. Serial No. 276,736.

*To all whom it may concern:*

Be it known that I, JOSEPH H. MOSEL, a citizen of the United States, residing at Lakewood, in the county of Cuyahoga and State of Ohio, have invented a certain new and useful Improvement in Trucks, of which the following is a full, clear, and exact description.

The present invention relates to the construction of a truck intended for the transportation of objects in factories or other buildings, and is particularly intended for use as a trailer truck forming a part of a train of trucks which are usually moved by means of an electric locomotive or otherwise. It is to be understood, however, that the present truck is not limited to use in the manner above described, but may be otherwise used and power may be furnished for moving the same in any fashion that may be found desirable.

The object of the invention is to provide a truck of simple, yet durable, construction which will stand up to its work and withstand the heavy usage to which such trucks are usually subjected.

Figure 1:
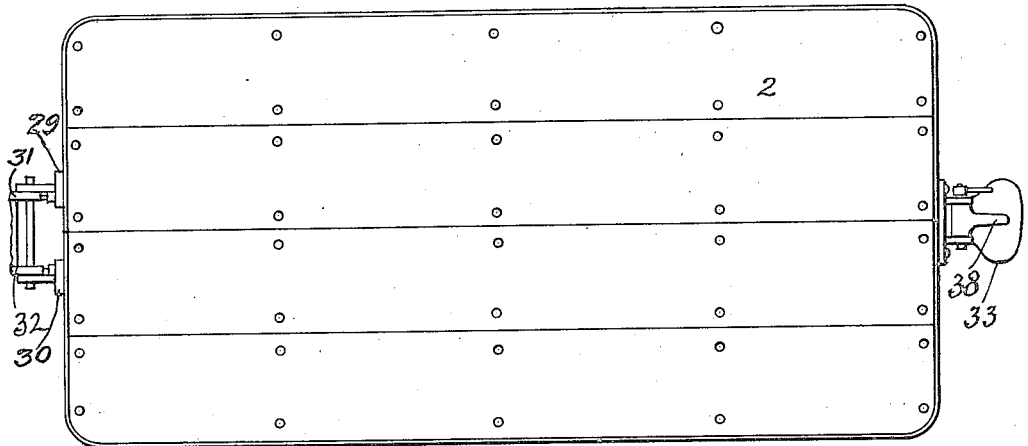
Figure 2:
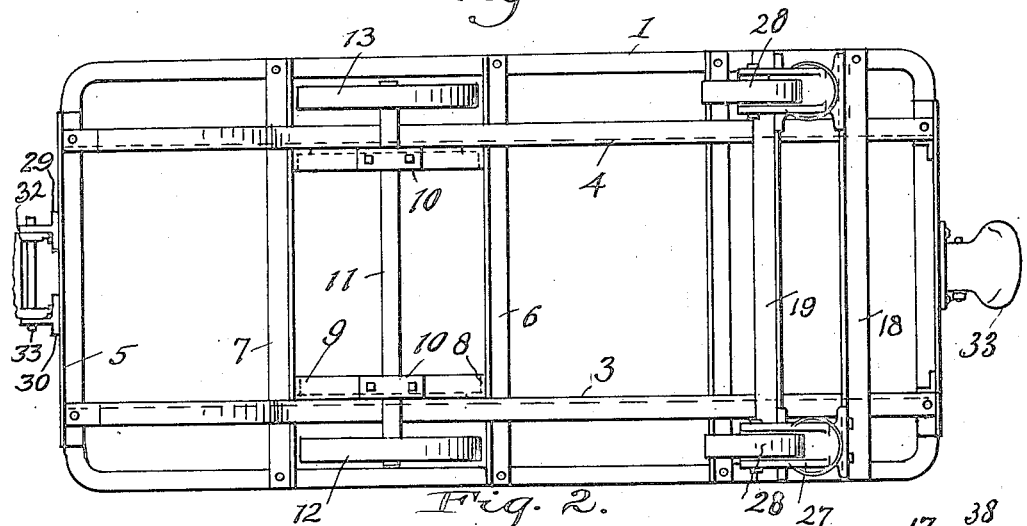
Figure 3:
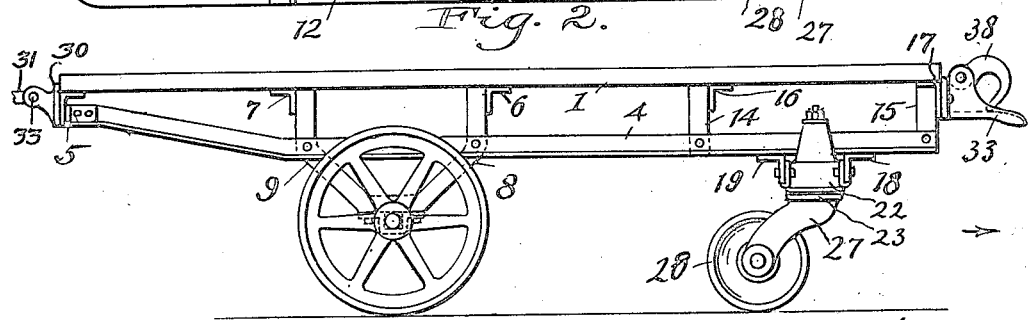

The further object is to provide a truck having a form of castor construction which is conveniently made and assembled, and one which is durable. A further object of the invention is to provide a coupler for a truck which is automatic in its coupling action and permits trucks to be coupled even though the trucks to be coupled approach each other at an angle or otherwise than in a straight line. Generally speaking, the invention may be said to comprise the elements and combinations thereof set forth in the accompanying claims:

Reference should be had to the accompanying drawings forming a part of this specification, in which Figure 1 is a top plan view of the truck; Fig. 2 is a bottom plan view of the truck; Fig. 3 is a side elevation of the truck; Fig. 4 is an elevation of one end of the truck; Fig. 5 is an elevation of the opposite end of the truck; Fig. 6 shows an elevation with portions in section of a part of the truck; Fig. 7 is a top plan view showing the coupler.

It will readily be appreciated that trucks which are utilized for the hauling of materials and for use generally in transportation in factories, are subject to very hard usage, and to withstand this usage they should be strongly built. This is sought to be accomplished in the truck herein described.

Referring to the drawings, 1 indicates a frame which in the present instance is substantially rectangular in form and is conveniently made by suitably bending and joining together angle iron pieces. The frame 1 is assembled so that one of the flanges of the angle iron is substantially horizontal, while the other is substantially vertical, and in this frame is laid a floor, preferably of wood, such as indicated at 2 in Fig. 1.

Beneath the frame 1 there extend two longitudinal members 3 and 4, these being spaced from each other. The members 3 and 4 at their rear ends are bent toward the frame 1 and at the ends are secured to the frame by means of an angle member 5.

Extending transversely across the frame are two angle iron members 6 and 7. These are secured to the under side of frame 1, and to these members 6 and 7 there are secured braces such as indicated at 8 and 9, there being two such braces. The braces 8 and 9 are secured to the cross members 6 and 7, and are also secured to the longitudinal members 3 and 4, so that the braces are secured, not only to the lower frame as represented by the longitudinal members 3 and 4, but to the upper frame 1.

As above stated there are two such frame members 8 and 9 which co-operate respectively with the members 3 and 4. The members 8 and 9 at their lower portions are bent inwardly into a substantial V or U shaped frame, as will be seen from Fig. 3 and to the lower portions of the braces are secured journal boxes or straps 10 which receive and support the axle 11, and at the outer end of the axle are wheels 12 and 13. These wheels just mentioned lie beneath and within the frame 1 so that there are no extensions beyond the sides of the frame 1.

The member 4 is also secured to the frame by means of support members 14 and 15, as shown in Fig. 3, and at the opposite side of the frame there are similar support members which co-operate with the member 3. The members 14 and 15 and their companion members just mentioned are secured to the angle members 16 and 17, which are in turn secured to the end of the said frame 1.

Extending transversely beneath the longitudinal members 3 and 4 are angle members 18 and 19, and to the depending flanges of these members are secured two castors which are generally represented at 20 and 21. Inasmuch as these castors are similar in construction and mounting, a description of one will suffice for a description of both.

The castor 20 comprises two parts (see Fig. 6) an outer part 22, and an inner part 23. The outer part is substantially cone shaped and has side portions thereof which are flat, and which are secured to the angular members 18 and 19. The inner part 23 is also in part cone shaped and is adapted to co-operate with the conical portion of the member 22, the part 23 being spaced from member 22 so that the bearing between the parts 22 and 23 is entirely upon the balls 25 later described. The member 23 is at the lower portion provided with a flange or base 24, which is adapted to co-operate with balls 25 which lie between the flange 24 and a portion of the part 22, thus forming a ball race. The two parts 22 and 23 are secured together by means of a bolt such as indicated at 26 or by any similar construction, as will be clearly understood by reference to Fig. 6. The construction just described permits the adjustment of the parts 22 and 23 to co-operate for wear as it may occur. The members 22 and 23 may be formed as castings and may be assembled without machining, except those portions which co-operate with the balls 25. The member 23 is hollow, which permits of insertion of bolt 26.

The construction which has just been described is a strong, durable construction, and is one which may be produced at low cost of manufacture.

The member 23 has formed integrally therewith depending legs which are represented at 27, these extending forwardly from the member 23, and between the legs 27 there is journaled a wheel 28. It will be seen that the castor construction which has just been described permits easy swiveling of the wheel 28 about the axis member 23.

At one end of the truck there is secured to the under part of the frame only two standards 29 and 30. Between these there lie ears 31 of a bail 32 of a coupler. This bail is triangular in shape and comprises the arms 32ª and 32ᵇ, the support end of the arms being secured to or integral with ears 31. A pin 33 extends through suitable openings provided in the standards 29 and 30 and the ears 31 so that the coupler is pivoted. At the forward end of the bail, and in front of the supports where the arms join, there is an extension 32ᶜ provided with an opening 32ᵈ, the purpose of which will be readily understood.

At the opposite end of the truck there is a draw bar element which in the present instance comprises a unitary structure formed to have an extending base 33 and upright plate 34, this being secured to the end of the truck opposite to that which has just been described, and is preferably secured to the transversely extending member 17, as will be seen in Fig. 3. The part 34 of the draw bar portion of the coupler is provided with outwardly extending ears such as indicated at 35, these ears being spaced apart, and between them there lies a hub 36, this hub being provided with a bore which receives the pin 37, which pin extends also through suitable openings formed in the ears 35. The hub is formed with an extension assuming the form of a hook such as indicated at 38. The front of the hook is adapted to normally lie against the bottom plate 33 and the weight of the hook normally maintains this condition.

The manner in which the coupling elements upon adjacent cars which have been described, co-operate with each other will be clearly understood from the explanation of Fig. 7. The part 32ᶜ slides upon the part 33, and noses its way beneath the hook 38, which drops into the opening 32ᵈ, so that when subsequently there is a pull between the adjacent trucks the hook engages with the part 32ᶜ and so forms a coupling. It will be apparent that the connection is such that the trucks may readily move with respect to each other about the pivotal connection as the trucks may be pulled in a train.

The coupling action which has just been described is automatic, requiring no attendance except when the adjacent trucks are to be uncoupled and this is accomplished by operation of a handle 39 which is connected to the member 38.

The construction is such that the trucks to be coupled need not approach each other in line, but may approach each other at substantially ninety degrees to each other, provided the opening 32ᵈ of the bail is in position to pass beneath the point of the hook 38.

It will also be apparent that the hook 38 may be used to co-operate with other forms of coupling than that represented at 32 in Fig. 7.

From inspection of Fig. 3 it would be apparent that the truck frame construction is an exceedingly strong one, and by bending the members 3 and 4 upwardly so as to form a connection with the frame 1, the entire frame construction is made much stronger thereby and able to resist the push or pull which may be incident to its use, particularly when forming a portion of a train of trucks.

Having described my invention, I claim:

1. A truck comprising a frame adapted to support a floor, a subframe comprising longitudinally extending members which are spaced with respect to the first mentioned frame, said longitudinally extending members being of less spacing than the width of the frame, struts connecting the said members of the subframe with the first mentioned frame, an axle extending transversely of the truck, means connecting the said axle to the longitudinal members of the subframe, said means lying beneath certain of the struts which connect the side members of the subframe with the first mentioned frame, the said longitudinally extending members of the subframe being bent to extend toward the first mentioned frame at one end thereof, means for securing the bent ends of the subframe to the first mentioned frame.

2. A truck comprising a main frame, a floor supported by said main frame, a subframe comprising longitudinally extending members which are spaced with respect to the main frame struts connecting the subframe to the main frame, transversely extending members secured to the main frame and secured to the struts, an axle extending transversely of the frame and beneath the subframe, means supporting the subframe from the axle, said means being substantially beneath certain of the struts which connect the subframe with the main frame, the longitudinal members of the subframe being bent toward the main frame adjacent an end thereof, and a transversely extending member which connects the bent ends of the subframe to the main frame.

3. A truck comprising a main frame, a floor supported by the main frame, a subframe comprising longitudinally extending members, struts connecting the said longitudinally extending members to the main frame, U-shaped members which are connected to the subframe and to the main frame, journal boxes secured to the lower portion of the U-shaped members and adapted to support an axle, the longitudinal members of the subframe being bent at one of their ends to extend toward the main frame and means for joining the bent ends of said longitudinally extending members to the main frame.

4. A truck comprising a main frame, a floor supported by said main frame, a subframe comprising longitudinally extending members, said longitudinally extending members being adjacent, one of their ends bent toward the main frame, means for securing the bent ends of said longitudinally extending members to the main frame, struts connecting the said longitudinally extending members to the main frame, U-shaped members secured to the main frame and to the said longitudinally extending members, journal boxes secured to the lower portion of the U-shaped members, and adapted to support an axle, transversely extending members cooperating with the subframe and placed adjacent one end thereof, and castors secured to the said transversely extending members.

5. A truck comprising a main frame, a floor supported by said main frame, a subframe of less width than the main frame, comprising longitudinally extending members, which are bent adjacent one of their ends and extending toward the main frame, a transversely extending member to which the main frame and the bent ends of the subframe are connected, a coupler element secured to said transversely extending member, strut members, transversely extending members connected to the struts, said transversely extending members being secured to the side members of the main frame, and means for mounting wheel members on the subframe of said truck.

In testimony whereof, I hereunto affix my signature.

JOSEPH H. MOSEL.